United States Patent
Sethi et al.

(10) Patent No.: US 9,650,888 B2
(45) Date of Patent: May 16, 2017

(54) MULTI-MODE MEASUREMENTS WITH A DOWNHOLE TOOL USING CONFORMABLE SENSORS

(71) Applicant: Halliburton Energy Services, Inc., Houston, TX (US)

(72) Inventors: Neeraj Sethi, Haryana (IN); Burkay Donderici, Houston, TX (US); Luis San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/426,479

(22) PCT Filed: Sep. 30, 2014

(86) PCT No.: PCT/US2014/058166
§ 371 (c)(1),
(2) Date: Mar. 6, 2015

(87) PCT Pub. No.: WO2015/050834
PCT Pub. Date: Apr. 9, 2015

(65) Prior Publication Data
US 2016/0090835 A1    Mar. 31, 2016

(30) Foreign Application Priority Data
Oct. 3, 2013  (IN) .......................... 2933/DEL/2013

(51) Int. Cl.
*G01V 3/30* (2006.01)
*G01V 3/28* (2006.01)
(Continued)

(52) U.S. Cl.
CPC ............ *E21B 47/122* (2013.01); *E21B 47/00* (2013.01); *E21B 47/0905* (2013.01); *G01V 3/18* (2013.01); *G01V 3/30* (2013.01); *G01V 3/38* (2013.01)

(58) Field of Classification Search
CPC ....................................................... G01V 3/30
(Continued)

(56) References Cited

U.S. PATENT DOCUMENTS 6,727,706 B2    4/2004  Gao et al.
6,765,384 B2 *  7/2004  Morys .......................... 324/338
(Continued)

OTHER PUBLICATIONS

International Search Report and Written Opinion issued in related PCT Application No. PCT/US2014/058166 mailed Jan. 15, 2015, 9 pages.
(Continued)

*Primary Examiner* — Bot Ledynh
(74) *Attorney, Agent, or Firm* — Scott Richardson; Baker Botts L.L.P.

(57) ABSTRACT

An example downhole tool may include a tool body and a first conformable sensor coupled to the tool body. The first conformation sensor may include a flexible material, a transmitter coupled to the flexible material, and a plurality of receivers coupled to the flexible material. The downhole tool may further include a control unit with a processor and a memory device coupled to the processor, the memory device containing a set of instructions that, when executed by the processor, cause the processor to output control signals to a first combination of the plurality of receivers corresponding to a first operating mode; and output control signals to a second combination of the plurality of receivers corresponding to a second operating mode.

20 Claims, 8 Drawing Sheets

(51) Int. Cl.
*E21B 47/12* (2012.01)
*E21B 47/09* (2012.01)
*E21B 47/00* (2012.01)
*G01V 3/18* (2006.01)
*G01V 3/38* (2006.01)

(58) Field of Classification Search
USPC .......................................................... 324/338
See application file for complete search history.

(56) References Cited

U.S. PATENT DOCUMENTS

| | | | |
|---|---|---|---|
| 7,046,010 | B2 | 5/2006 | Hu et al. |
| 7,324,010 | B2* | 1/2008 | Gardner et al. ........... 340/854.4 |
| 7,899,622 | B2 | 3/2011 | Wang |
| 2006/0103389 | A1* | 5/2006 | Bespalov et al. ............. 324/338 |
| 2008/0040042 | A1* | 2/2008 | Page ............................... 702/11 |
| 2009/0195244 | A1 | 8/2009 | Mouget et al. |
| 2010/0097066 | A1 | 4/2010 | Gao |
| 2011/0221443 | A1* | 9/2011 | Bittar et al. .................. 324/339 |
| 2012/0095686 | A1 | 4/2012 | Legendre et al. |

OTHER PUBLICATIONS

Neil Goldfine, "Surface-Mounted Eddy-Current Sensors for on-Line Monitoring of Fatigue Tests and for Aircraft Health Monitoring", Second Joint NASA/FAA/DoD Conference on Aging Aircraft, Aug. 1998.

Neil Goldfine et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

International Preliminary Report on Patentability issued in related Application No. PCT/US2014/058166, mailed Apr. 14, 2016 (6 pages).

* cited by examiner

MULTI-MODE MEASUREMENTS WITH A DOWNHOLE TOOL USING CONFORMABLE SENSORS

CROSS-REFERENCE TO RELATED APPLICATION

The present application claims priority to Indian provisional application number 2933/DEL/2013, filed Oct. 3, 2013 and titled "MULTI-MODE MEASUREMENTS WITH A DOWNHOLE TOOL USING CONFORMABLE SENSORS," and is a U.S. National Stage Application of International Application No. PCT/US2014/058166 filed Sep. 30, 2014, both of which are incorporated herein by reference in their entirety for all purposes.

BACKGROUND

The present disclosure relates generally to downhole drilling operations and, more particularly, to multi-mode measurements with a downhole tool using conformable sensors. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. In certain operations, measurements of downhole elements within the wellbore may be generated, including measurements of a casing within the wellbore. Typically, those measurements are limited with respect to their granularity, and small features within the wellbore may not be identifiable through the measurements.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
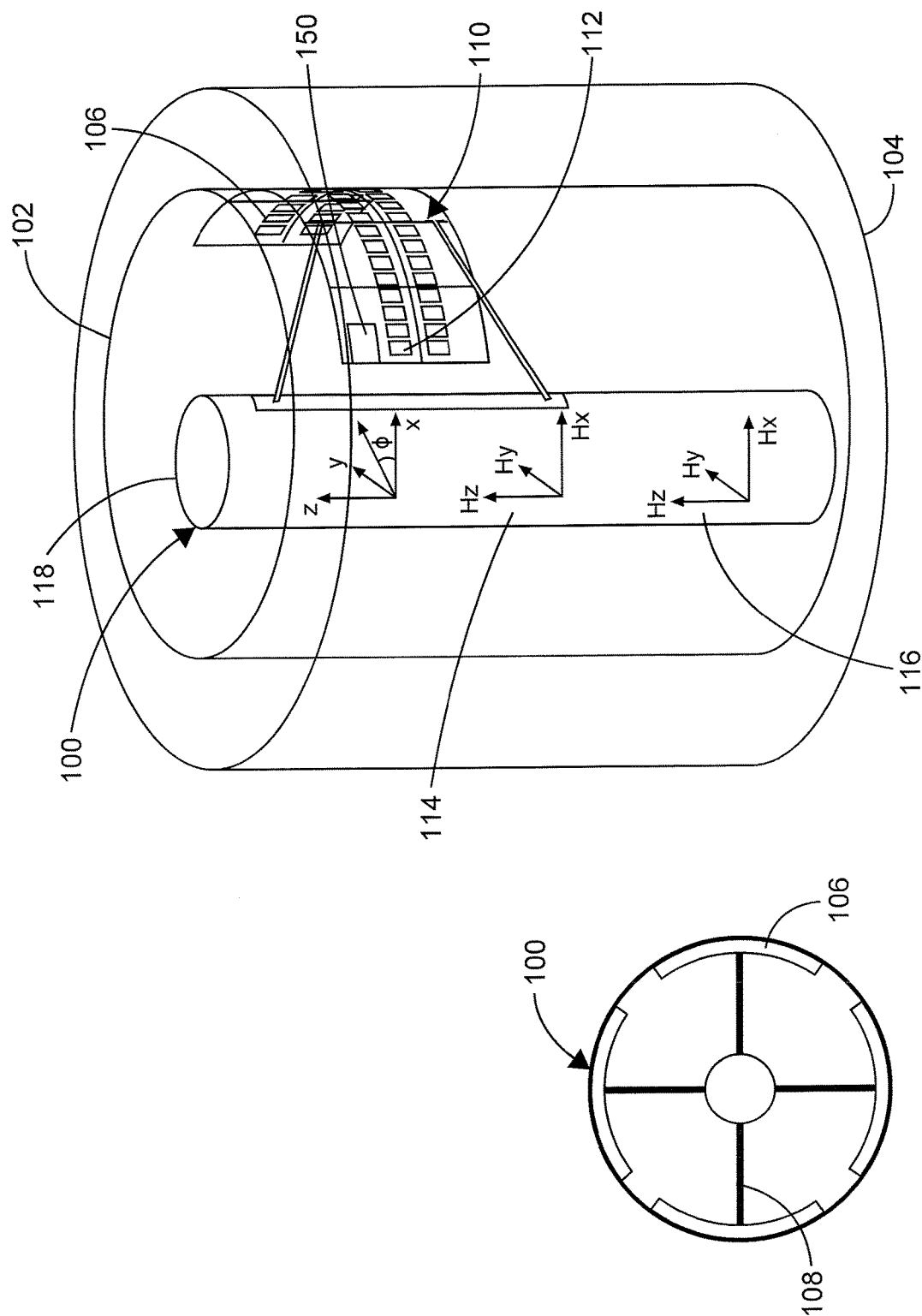
FIG. 1 is a diagram showing an example downhole tool with conformable sensors, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to multi-mode measurements with a downhole tool using conformable sensors.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple," "coupled," and "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 9:
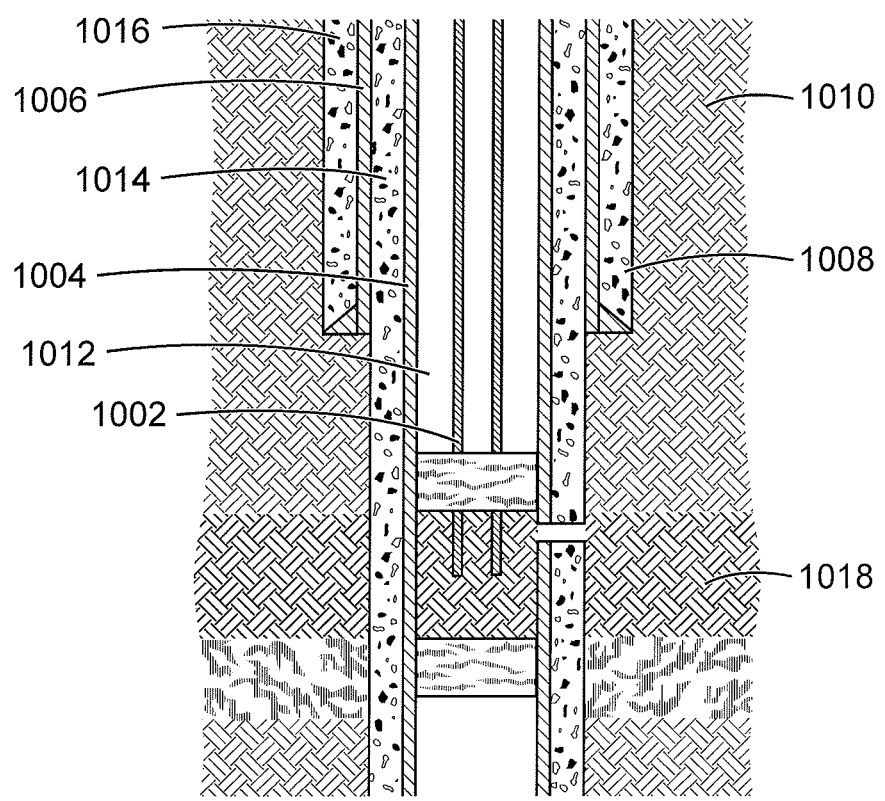
FIG. 9 is a diagram showing an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 9 is a diagram showing an example production environment and illustrates casings 1002, 1004, and 1006 disposed within a borehole 1008 in a rock formation 1010. The casings 1002-1004 may be concentric or nearly concentric and secured within the borehole 1008 and each other through cement layers 1012, 1014, and 1016. The center casing 1002 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and/or while it is being drilling, protecting a water table in the formation 1010 from contamination, and/or maintaining pressure within the borehole 1008. Accordingly, damage to the integrity of the casings 1002-1006 may compromise these purposes and/or otherwise interfere with drilling operations and/or production of the well. Common damage to the casings includes crack and corrosion, which can be an indication of a defective cement bond between a casing and the borehole wall. Downhole measurements may be used to survey the casings 102-106 to identify damage.

According to aspects of the present disclosure, a downhole tool with at least one conformable sensor may be placed downhole in either an open hole (non-cased) environment or a cased environment, to measure and survey downhole elements, such as downhole casings, boreholes, and formations. As used herein, conformable sensors may comprise planar sensors that are printed or disposed on a flexible material that can conform to the shape of a surface with which it is in contact and may produce high resolution, azimuthally sensitive measurements that can be used to visualize that surface. As will be described below, an example downhole tool with conformable sensors may comprise one or more operating modes which correspond to different speeds, depths, and resolutions of measurements, providing for a fast and accurate imaging of the casing in a cased environment or the borehole/formation in an open hole environment.

FIG. 1 is a diagram that shows two views of an example downhole tool 100 with at least one conformable sensor 112, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. The conformable sensor 112 may include a primary winding having extended portions for creating an electromagnetic (EM) field in a target, in this case the pipe 102, and secondary windings within the primary winding for measuring the current response of the target to the generated EM field. The measured current response may be processed to identify physical parameters of the target, as will be described below. The resolution of the measurements taken by the conformable sensor 112 may increase as the "stand-off" distance between the sensor 112 and the target decreases.

In the embodiment shown, the conformable sensor 112 is one of an array of conformable sensors 110 coupled to a pad 106 that is coupled to and extendable from the tool body 118 through spring mechanisms or motorized arms 108 to contact the pipe 102. Other locations and arrangements for the conformable sensor 112 are possible and will be described below. The spring mechanisms or motorized arms 108 may similarly establish contact between the pad 106 and a borehole wall in an open hole environment. The elasticity of the pad 106 and tension in the arm 108 may be designed in such a way that the pad 106 will substantially deform to the shape of the pipe 102, decreasing the stand off distance between the sensor 112 and which may increase the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and/or other stations cover other sets, providing full coverage.

As stated above, the conformable sensor 112 may include at least one portion that functions as a transmitter and generate electromagnetic (EM) fields in a target, such as the pipe 102, and at least one portion that functions as a receiver that receives and measures the current responses of the target to the generated EM fields. In certain embodiments, the downhole tool 100 may comprise separate transmitters 114 or receivers 116 mounted on the tool body 118. These additional transmitters 114 or receivers 116 may be inductive-type antennas, realized with coils, solenoids, or rotating and/or moving magnets. In certain embodiments, EM fields may be generated and the corresponding current responses measured with any combination of the transmitter 114, the receiver 112, and the transmitters and receivers within the conformable sensor 112. Notably, when the transmitter is farther away from the receiver, the depth of investigation may increase but the measurement resolution may decrease.

In use, the downhole tool 100 may generate high resolution measurements of the pipe 102 by placing the pad 106 in contact with the pipe 102 or other target and transmitting a time-varying EM signal from a transmitter of the conformable sensor 112. The signal may generate eddy currents in the pipe 102. The eddy currents may generate secondary currents that contain information about the pipe 102, and the secondary currents may be measured at some or all of the receivers of the conformable sensor 112. Conversely, the downhole tool 100 may generate low-resolution measurements of the pipe 104 by transmitting a time-varying electromagnetic signal from transmitter 114 and measuring the current response of the pipe 104 at one or more receivers of the conformable sensor 112.

Figure 2:
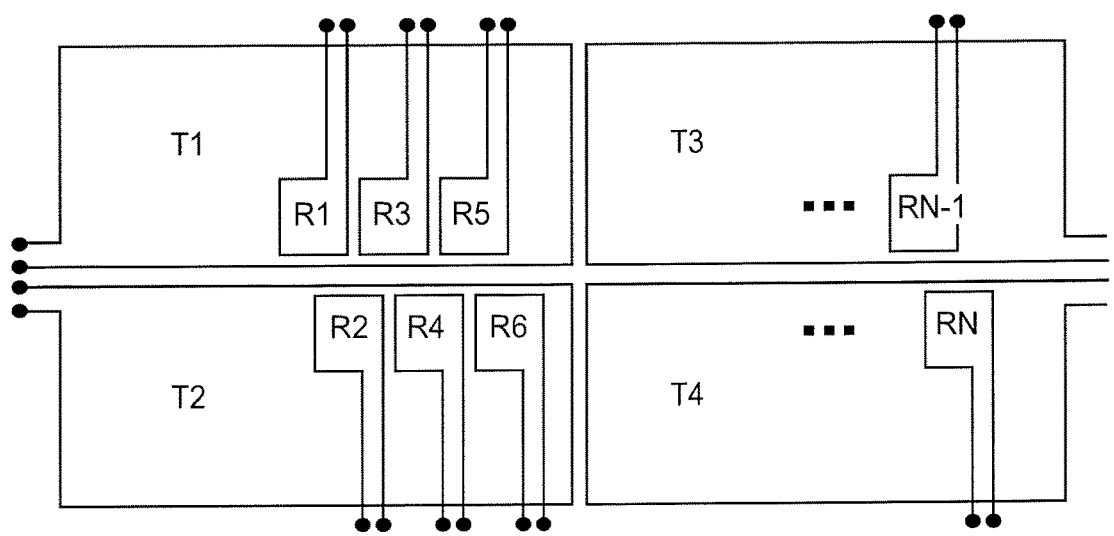
FIG. 2 is a diagram showing example antenna windings for a conformable sensor, according to aspects of the present disclosure.

FIG. 2 is a diagram showing example antenna windings for a conformable sensor, according to aspects of the present disclosure. The windings shown may comprise the windings for a single conformable sensor and may be formed by circuit printing or other deposition methods on a flexible surface (not shown). As can be seen, the windings include transmitters T1-T4 and staggered receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the azimuthal resolution of the sensor since more measurements are made per azimuthal position. Although one example of antenna windings for a conformable sensor is shown in FIG. 2, other configurations are possible. For example, the size and relative positions of the transmitters T1-T4 and receivers R1-RN may be altered, and the functionality of the receivers and transmitters can be switched, e.g., T1 may be a receiver and R3 may be a transmitter.

Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN. The number and size of the receiver pairs may determine the granularity and resolution of the measurements.

Figure 3:
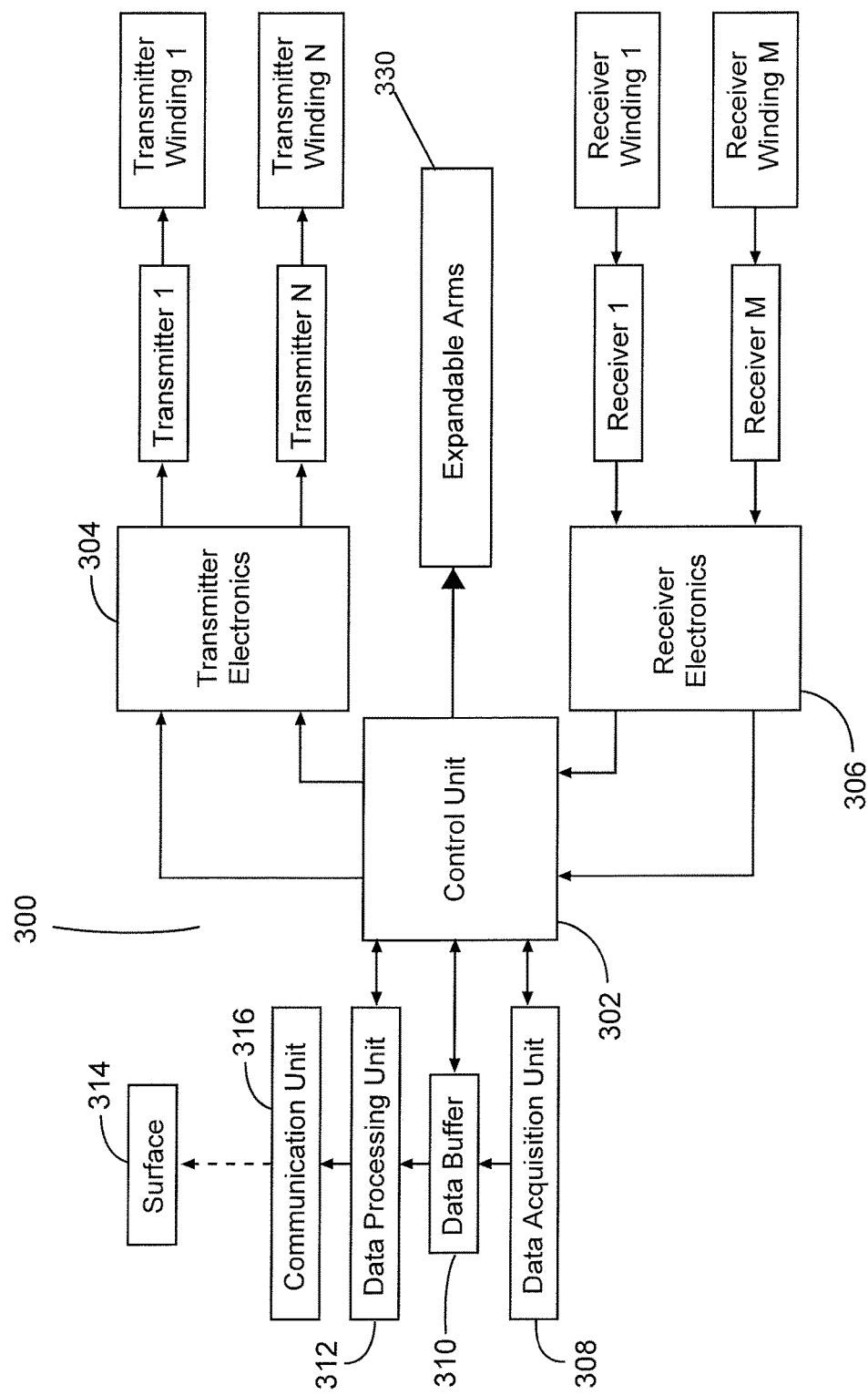
FIG. 3 is a diagram showing an example control system for a downhole tool with conformable sensor array, according to aspects of the present disclosure.

In certain embodiments, the conformable sensors may be controlled through a control system associated with the downhole tool. FIG. 3 is a diagram showing an example control system 300 for a downhole tool with a conformable sensor, according to aspects of the present disclosure. The system 300 comprises a control unit 302 that may function as the primary controller for the tool and may be communicably coupled to transmitters 1-N through transmitter electronics 304, to receivers 1-M through receiver electronics 306, and to mechanical, electrical or hydraulic elements 330 coupled to and configured to extend pads to which the transmitters 1-N and receivers 1-M coupled. Other mechanical, electrical, or hydraulic element of the tool may also be coupled to the control unit 302. At least one of the transmitters 1-N and receivers 1-M may comprise elements of a conformable sensor or an array of conformable sensors. The transmitter electronics 304 and receiver electronics 306 may comprise circuit boards to which some or all of the transmitters 1-N and receivers 1-M are coupled.

The control unit 302 may trigger the transmitter electronics 304 to generate a time-varying EM signal through one or more of the transmitters 1-N. The time-varying signal may be a sinusoidal signal, its phase and amplitude set at a desired value. As is described above, the EM signals generated through the transmitters 1-N may be coupled to and generate eddy currents in the pipe or borehole that are in immediate contact with the conformable sensors, and the eddy currents may generate secondary currents that contain information about the pipe or borehole, including features of the pipe or borehole. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 302 may receive the measurements from the receivers 1-N through the receiver electronics 306 and may transmit the measurements to the data acquisition unit 308. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 308, the measurements may be digitized, stored in a data buffer 310, preprocessed at data processing unit 312, and sent to the surface 314 through a communication unit 316, which may comprise a downhole telemetry system In certain embodiments, a downhole tool may have multiple operating modes, and the control system 300, and in particular the control unit 302 may be responsible for controlling the operating modes of the downhole tool. The operating modes may correspond to different combinations of antennas being triggered, different combinations of transmitters and receivers being triggered, different excitation frequencies used by the transmitters, and different combinations of receivers used to measure the results. For example, one operating mode may comprise a deep sensing mode where transmitters on the tool body are used with receivers in the conformable sensors on pads to increase the depth of investigation for the tool. Another operating mode may comprise a high resolution mode where the transmitters and receivers on the conformable sensors are used to generate high resolution images of a downhole element.

The control unit 302 may include an algorithm, characterized by a set of instructions stored within a memory device of the control unit and executable by a processor of the control unit, regarding the operating modes to enter depending on the downhole conditions, and may generate control signals to the transmitter electronics 304 and receiver electronics 306 based, at least in part, on the instructions. In one example control algorithm, the control unit 302 may cause the tool to operate in a normal operating mode, where medium resolution and depth of investigation measurements are taken using a combination of transmitters and receivers on the tool body and the extendable pad. If a feature of interest near the tool is identified, the control center 302 may enter into a high resolution operating mode to provide a robust, azimuthally sensitive image of the feature. In that case, the control unit 302 may output control signals to the transmitter and receivers of a single conformable sensor azimuthally aligned with the feature, for example, or to two conformable sensors located near each other on an extendable pad. Likewise, if a feature of interest further away from the tool is identified, the control center may enter into the deep-sensing operating mode to more fully characterize the feature of interest, in which the control unit 302 outputs control signals to the transmitters and receivers on the tool body and extendable pads.

In certain embodiments, a control algorithm at the control unit 302 may also comprise selection between one or more antenna operating modes corresponding to the individual configurations of the conformable sensors. These antenna operating modes may be used in addition or instead or the algorithm described above. In certain embodiments, the antenna operating modes may correspond to control signals used to trigger a particular combination of transmitters and receivers in a confirmable sensor. In other embodiments, the antenna operating modes may be utilized after the measurements are taken, through processing techniques that will be described below.

Figure 4:
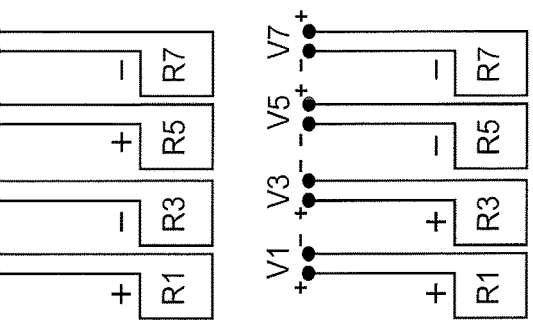
FIG. 4 is a diagram showing an example antenna operating modes for a conformable sensor, according to aspects of the present disclosure.
Figure 4:
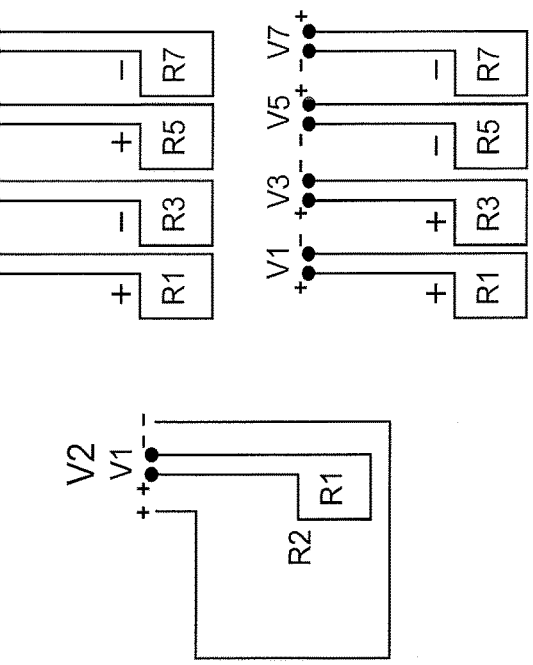
Figure 4:
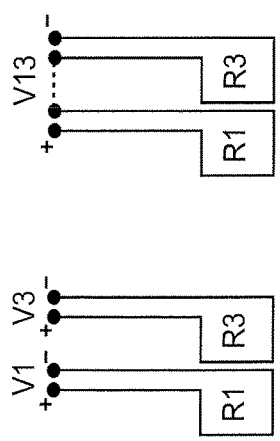
Figure 4:
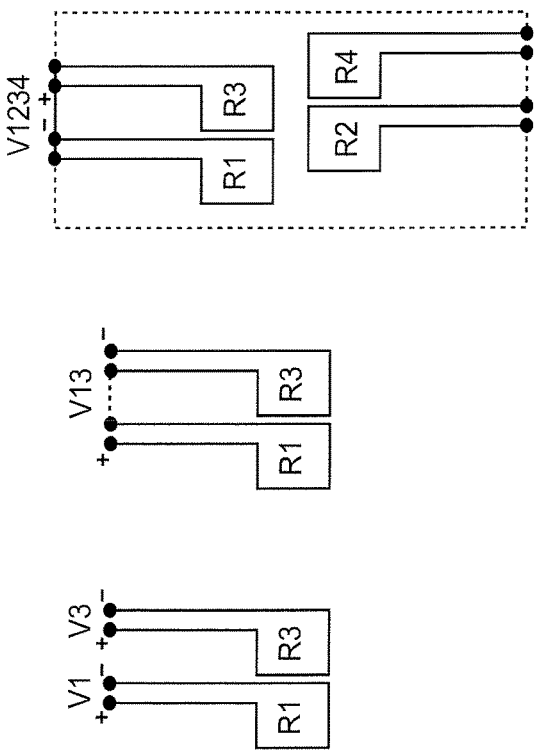

FIG. 4 is a diagram showing example antenna operating modes for a conformable sensor, according to aspects of the present disclosure. As can be seen, the antenna modes may correspond to receiver antenna windings similar to those described with reference to FIG. 2. Antenna operating mode (a) shows a case where a measurement from each receiver in a conformable sensor may be generated and received independently. In particular, receiver R1 may make a measurement V1 and receiver R3 may make a measurement V3 in response to the excitation signal from one transmitter. The measurements V1 and V3 may be received and individually used to characterize the downhole element. Due to independent nature of the measurements, this antenna operating mode may provide the highest number of data points resulting in the highest resolution image of the downhole element, with each measurement corresponding to a pixel of the resulting image.

Antenna operating mode (b) shows configuration where the outputs V1 and V3 from receivers R1 and R3, respectively, are combined into a single measurement V13. V13 may comprise a sum of both measurements V1 and V3. In certain embodiments, the summation may be performed at the control unit of a control system utilizing a binary arithmetic operation, after the measurements V1 and V3 are received at the control center. In certain embodiments, the summation can be performed by hardware coupled to the receivers, such as receiver electronics, when prompted by a control signal from a control unit, and the combined measurement may be received at the control unit. Antenna operating mode (b) may be used where a higher signal and higher depth of penetration is required than in antenna operating mode (a), but it will have a lower resolution by reducing the number of data points in the resulting image.

Antenna operating mode (c) is similar to that in (b), but a two-dimensional combination of receivers is utilized instead of a one-dimensional combination. In particular, the outputs of receivers R1,-R4 are combined into a single measurement V1234. This combination can also be performed in software or hardware of a control system. Antenna operating mode (c) will provide higher signal and higher depth of penetration than antenna operating mode (c), with an even lower resolution.

Antenna operating mode (d) comprises an operating mode which uses multiple receivers of different sizes at the same sensing position. The use of different sized antenna as the same position may allow for a selection between high-low resolution and low-high depth of penetration/signal by selecting one of the receivers R1 and R2 to make a measurements. However, operating mode (d) requires a different wiring configuration than the other modes, and may require that the conformable sensor have a specialized design.

Antenna operating mode (e) comprises a periodic operating mode in which a periodic field distribution is provided by adjusting the polarity of at least one signal measurement from the receivers. In this case, a spatial distribution of fields with different periodicity can be obtained, which can be used to probe the target features with different wavelengths. For example, the upper image in (e) shows a periodicity that is equal to twice of the separation between the receivers, while the lower image shows four times the separation. All of the modes described above can be activated or deactivated in real-time or as post-processing based on the signal levels, depth of penetration, or resolution that needs to be attained based on the application.

According to aspects of the present disclosure, once the measurements are received, they may be aggregated and processed to produce a visualization of the downhole element being measured or surveyed. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. In certain embodiments, aggregating and processing the measurements may comprise aggregating and processing the measurements using an inversion algorithm implemented as a set of instructions in the control unit that are executable by a processor of the control unit to perform data calculations and manipulations necessary for the inversion algorithm. The inversion algorithm may be specific to the environment in which the downhole tool is used (cased or open hole) and may be designed to identify different features unique to the environment. Notably, measurements taken using the different operating modes of the downhole tool and conformable sensors at similar locations may be combined into a single, robust image.

Figure 5:
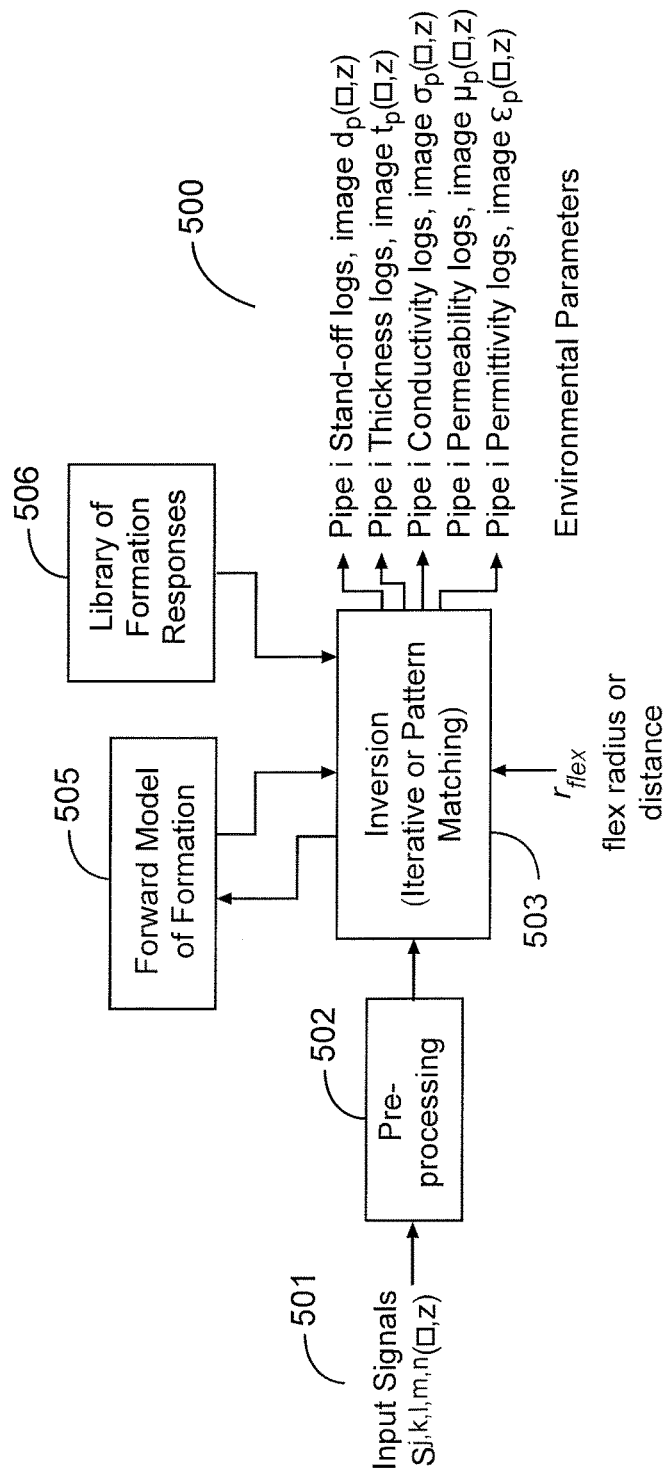
FIG. 5 is a block diagram showing an example inversion algorithm for measurements from a cased environment, according to aspects of the present disclosure.

FIG. 5 is a block diagram on an example inversion algorithm for a cased environment with one or more casings, according to aspects of the present disclosure. An input signal 501 may comprise the measurements from the receivers of the downhole tool, including the receivers of the conformable sensor, taken in numerous operating modes. In certain embodiments, the input signals may be divided into windows, such as time frequency, or space windows. In one example, the measurements from the operating modes may be divided into azimuthal windows, which are then subdivided by time and frequency. The measurements for corresponding windows may be "stacked" or processed together, to improve the signal to noise ratio and quality of the measurements and the resulting image.

The inversion algorithm may comprise a pre-processing block 502, which may receive the input signals. The pre-processing block 502 may process the input signal 501 to compensate for downhole conditions or to convert the input signals to a form usable within the inversion block 503. For example, the pre-processing block 502 may process the measurements to calibrate for temperature effects, convert between frequency to time domain, convert between complex-value to phase and amplitudes, and/or to remove noise by filtering in azimuth or depth.

The inversion algorithm further may comprise an inversion block 503, which may receive and process the signals from the pre-processing block 502 to identify parameters of the casings. In certain embodiments, the inversion block 503 may receive a model 504 of the casing or casings in which the downhole tool was disposed. The inversion block 503 may implement a cost function to identify parameters of the casing or casings that produce the minimum mismatch between the model 504 and the input signals 501. The cost function may be defined, for example, by utilizing least squares minimization through $L_2$ norm. The inversion block 503 may output data on one or more parameters of the casings.

In certain embodiments, a library 505 of casing responses from other casings and conformable sensors can be used instead of or in addition to the model 504. For example, the library 505 may be used if the parameter dimensions of the casing responses are low in number and also small in range, so that an accurate library can be calculated. If library 505 is used, a multi-dimensional interpolation can be used to obtain the parameters of the casing closest to the measurements.

The inversion block 503 may generate output including one of more parameters of the casings measured by the downhole tool that may be used to visualize the casing. Example parameters include the stand-off distance between the sensors and the casing as well as the thickness, conductivity, permeability, and permittivity of the casing. Because of the resolution offered by conformable sensors, very small features (on the order of 0.1 inches) can be imaged on the casing in direct contact with the conformable sensor. In the case where tool body transmitters and receivers are used, information on multiple casings may be recovered (pipe index shown as i in the figure). In certain embodiments, the downhole tool may make measurements as it is lowered to different depths within the casing, collecting more data points. These points can be combined to form a log of the casing, providing an image of the parameters of the entire casing, rather than one axial portion. Alternatively, discrete azimuthal measurements from each depth can be combined to obtain an image of the casing. In addition to the pipe parameters, certain environmental parameters, such as temperature, pipe stresses, eccentricity of the tool in the borehole or pipe can be obtained.

Figure 6:
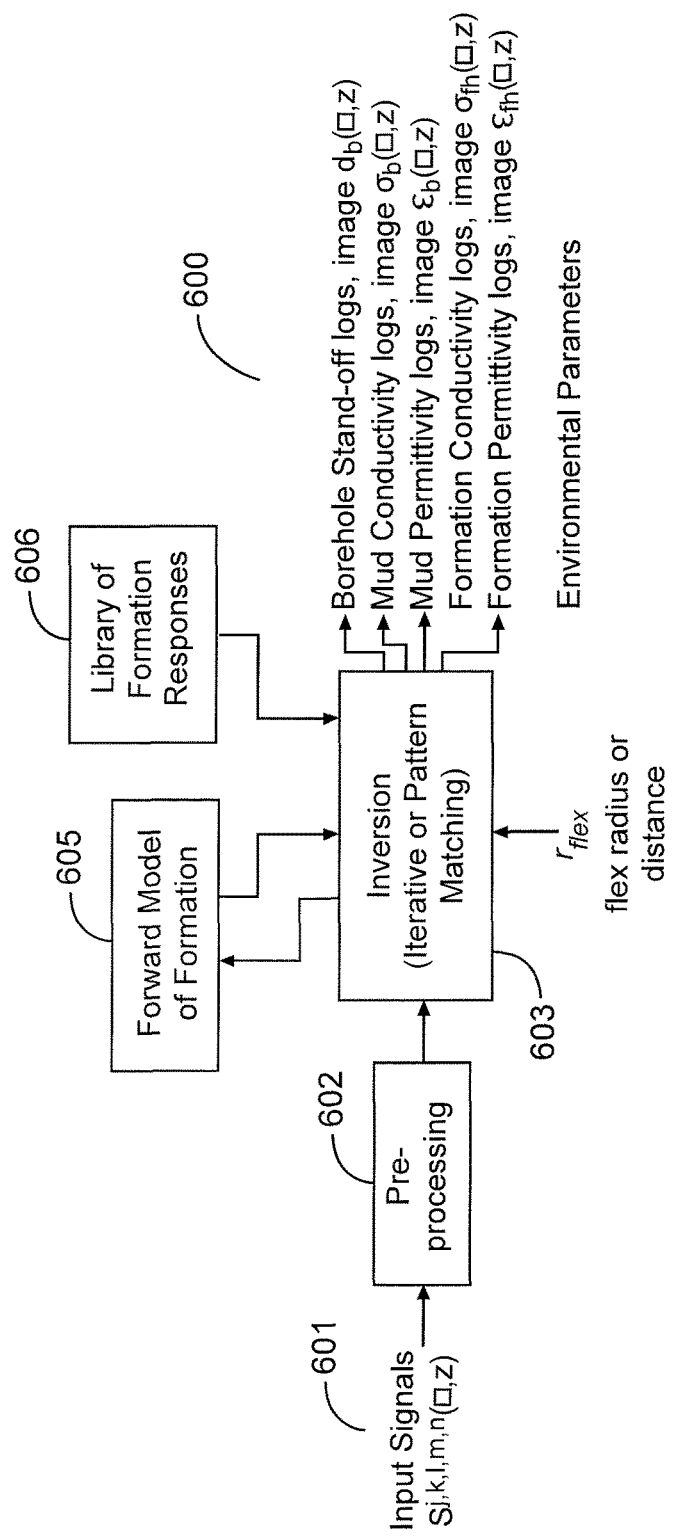
FIG. 6 is a block diagram showing an example inversion algorithm for measurements from an open hole environment, according to aspects of the present disclosure.

FIG. 6 is a block diagram on an example inversion algorithm for an open hole environment, according to aspects of the present disclosure. As can be seen, the inversion algorithm 600 comprises similar features to inversion algorithm 500. For example, the input signals 601 and pre-processing block 602 may be similar to those described with respect to FIG. 4. The inversion block 603 may also be similar, processing the input signals 601 using a model 604 or library 605, with the a model 604 or library 605 corresponding to a borehole rather than a casing.

The inversion block 602 may output parameters specific to an open hole environment. For example, the parameters may include a stand-off distance between the conformable sensor and the borehole, mud conductivity and permittivity, and formation conductivity and permittivity. Shallow measurements taken using conformable sensors in a high resolution mode of a downhole tool may be used to estimate the electrical properties of drilling fluid within the borehole, and also flushed zone and mud cake in the formation. Like the inversion algorithm 500, the inversion algorithm 600 may output logs or images that can be used to visualize the entire borehole.

Figure 7:
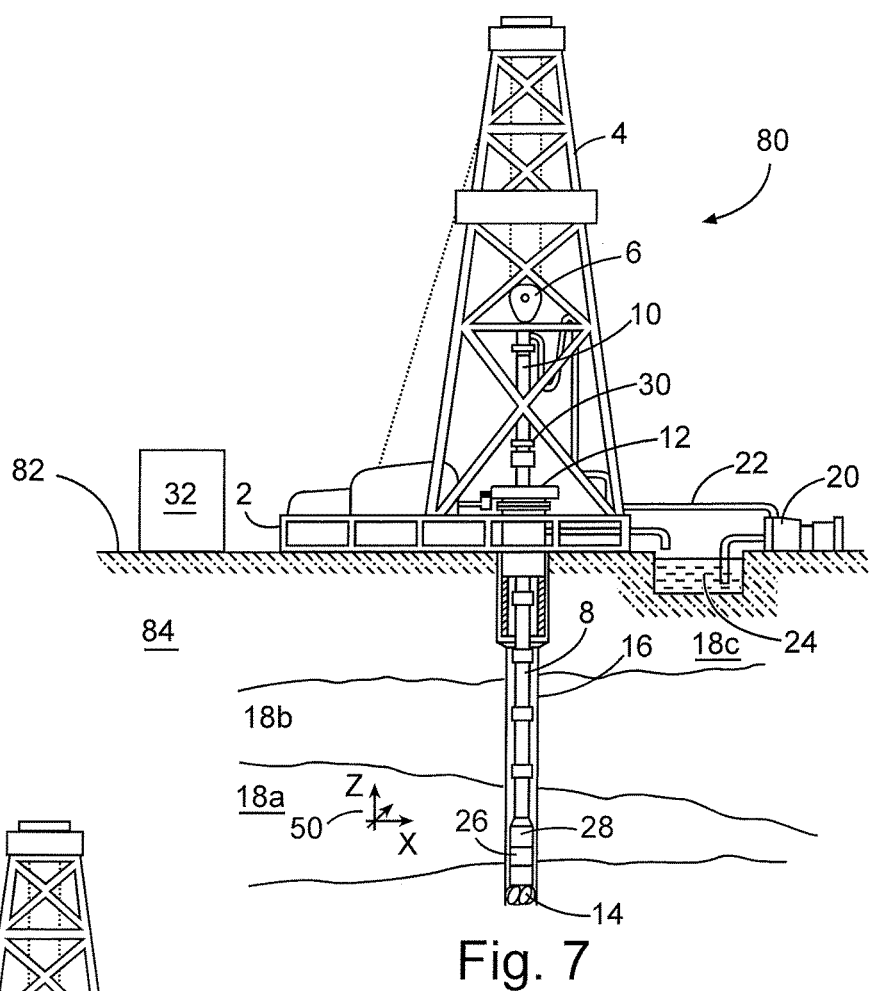
FIG. 7 is a diagram showing an illustrative logging while drilling environment, according to aspects of the present disclosure.

FIG. 7 is a diagram showing a subterranean drilling system 80 incorporating a downhole tool 26 with at least one conformable sensor and multiple operating modes, similar to the example downhole tools described above. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with at least one conformable sensor and multiple operating modes. As the bit extends the borehole 16 through the formations 18, the tool 26 may collect measurements relating to borehole 16 and the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 8:
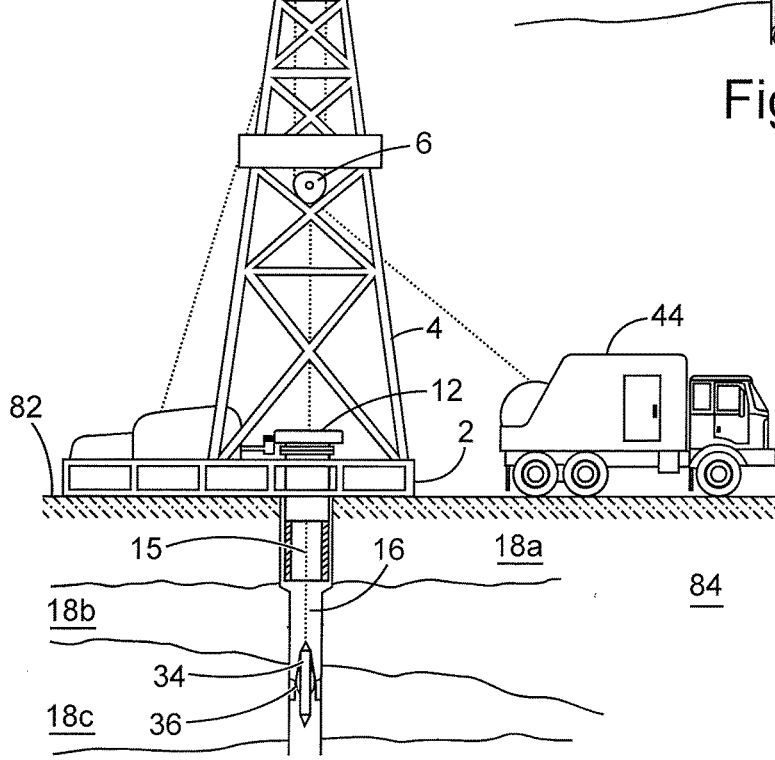
FIG. 8 is a diagram showing an illustrative wireline logging environment, according to aspects of the present disclosure.

At various times during the drilling process, the drill string 8 may be removed from the borehole 16 as shown in FIG. 8. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise a downhole tool 36 with at least one conformable sensor and multiple operating modes, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

According to aspects of the present disclosure, an example downhole tool may include a tool body and a first conformable sensor coupled to the tool body. The first conformation sensor may include a flexible material, a transmitter coupled to the flexible material, and a plurality of receivers coupled to the flexible material. The downhole tool may further include a control unit with a processor and a memory device coupled to the processor, the memory device containing a set of instructions that, when executed by the processor, cause the processor to output control signals to a first combination of the plurality of receivers corresponding to a first operating mode; and output control signals to a second combination of the plurality of receivers corresponding to a second operating mode.

In certain embodiments, the first conformable sensor is coupled to a pad extendable from the tool body. In certain embodiments, the first operating mode corresponds to at least one of a first resolution and a first depth of investigation; and measurements from each of the plurality of receivers. In certain embodiments, the second operating mode corresponds to a second resolution lower that is than the first resolution and a second depth of investigation that is higher than the first depth of investigation. In certain embodiments, the second operating mode corresponds to at least one combined measurement from two receivers of the plurality of receivers. In certain embodiments, the second operating mode corresponds to a measurement from at least one of the plurality of receivers with an altered polarity.

In certain embodiments, the downhole tool further comprises an other transmitter coupled to the tool body. The set of instructions may further cause the processor to output a control signal to at least the other transmitter and at least one of the plurality receivers of the first conformable sensor. In certain embodiments, the set of instructions further cause the processor to receive measurements from the at least one of the plurality of receivers; and output a control signal to the transmitter of the first conformable sensor in response to the received measurement. In any of the embodiments in this or the preceding two paragraphs, at least two of the plurality of receivers comprise different sizes.

According to aspects of the present disclosure, an example method for making downhole measurement comprises positioning a tool within a borehole, the tool comprising a first conformable sensor that includes a flexible material, a transmitter coupled to the flexible material, and a plurality of receivers coupled to the flexible material. A first electromagnetic (EM) signal may be generated using the transmitter. A first response of a downhole element to the first EM signal may be measured using a first combination of the plurality of receivers corresponding to a first operating mode. A second EM signal may be generated using the transmitter. A second response of the downhole element to the second EM signal may be measured using a second combination of the plurality of receivers corresponding to a second operating mode.

In certain embodiments, the first operating mode corresponds to a first resolution and a first depth of investigation. In certain embodiments, the second operating mode corresponds to a second resolution lower than the first resolution and a second depth of investigation that is higher than the first depth of investigation. In certain embodiments, measuring the first response of the downhole element comprises receiving a measurement from each of the plurality of receivers. In certain embodiments, measuring the second response of the downhole element comprises receiving at least one combined measurement from two receivers of the plurality of receivers. In certain embodiments, measuring the second response of the downhole element comprises receiving a measurement from at least one of the plurality of receivers with an altered polarity.

In certain embodiments, the method may further comprise generating a third EM signal from an other transmitter coupled to the tool, and receiving a third response of the downhole element to the third EM signal using at least one of the plurality receivers of the first conformable sensor. In certain embodiments, the method may further comprise receiving a measurement from the at least one of the plurality of receivers, and outputting a control signal to the transmitter of the first conformable sensor in response to the received measurement. In any of the embodiments described in this paragraph or the preceding two paragraphs, the first conformable sensor may comprise one of a plurality of conformable sensors coupled to the tool. In any of the embodiments described in this paragraph or the preceding two paragraphs, at least two of the plurality of receivers may comprise different sizes.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A downhole tool, comprising:
   a tool body; and
   a first conformable sensor coupled to the tool body, the first conformable sensor comprising
      a flexible material, wherein the flexible material conforms to a shape of a surface with which the flexible material is in contact;
      a transmitter coupled to the flexible material; and
      a plurality of receivers coupled to the flexible material; and
   a control unit comprising a processor and a memory device coupled to the processor, the memory device containing a set of instructions that, when executed by the processor, cause the processor to
      output control signals to a first combination of the plurality of receivers corresponding to a first operating mode; and
      output control signals to a second combination of the plurality of receivers corresponding to a second operating mode, wherein the second combination comprises at least one different receiver than the first combination.

2. The downhole tool of claim 1, wherein the first conformable sensor is coupled to a pad extendable from the tool body.

3. The downhole tool of claim 1, wherein the first operating mode corresponds to at least one of
   a first resolution and a first depth of investigation; and
   measurements from each of the plurality of receivers.

4. The downhole tool of claim 3, wherein the second operating mode corresponds to a second resolution lower that is than the first resolution and a second depth of investigation that is higher than the first depth of investigation.

5. The downhole tool of claim 3, wherein the second operating mode corresponds to at least one combined measurement from two receivers of the plurality of receivers.

6. The downhole tool of claim 5, wherein the second operating mode corresponds to a measurement from at least one of the plurality of receivers with an altered polarity.

7. The downhole tool of claim 1, further comprising an other transmitter coupled to the tool body.

8. The downhole tool of claim 7, wherein the set of instructions further cause the processor to output a control signal to at least the other transmitter and at least one of the plurality receivers of the first conformable sensor.

9. The downhole tool of claim 8, wherein the set of instructions further cause the processor to
   receive measurements from the at least one of the plurality of receivers; and
   output a control signal to the transmitter of the first conformable sensor in response to the received measurement.

10. The downhole tool of any one of claims 1-9, wherein at least two of the plurality of receivers comprise different sizes.

11. A method for making downhole measurement, comprising:
   positioning a tool within a borehole, the tool comprising
      a first conformable sensor that includes
         a flexible material, wherein the flexible material conforms to a shape of a surface with which the flexible material is in contact;
         a transmitter coupled to the flexible material; and
         a plurality of receivers coupled to the flexible material;
   generating a first electromagnetic (EM) signal using the transmitter; and
   measuring a first response of a downhole element to the first EM signal using a first combination of the plurality of receivers corresponding to a first operating mode;
   generating a second EM signal using the transmitter; and
   measuring a second response of the downhole element to the second EM signal using a second combination of the plurality of receivers corresponding to a second operating mode, wherein the second combination comprises at least one different receiver than the first combination.

12. The method of claim 11, wherein the first operating mode corresponds to a first resolution and a first depth of investigation.

13. The method of claim 12, wherein the second operating mode corresponds to a second resolution lower than the first resolution and a second depth of investigation that is higher than the first depth of investigation.

14. The method of claim 11, wherein measuring the first response of the downhole element comprises receiving a measurement from each of the plurality of receivers.

15. The method of claim 14, wherein measuring the second response of the downhole element comprises receiving at least one combined measurement from two receivers of the plurality of receivers.

16. The method of claim 12, wherein measuring the second response of the downhole element comprises receiving a measurement from at least one of the plurality of receivers with an altered polarity.

17. The method of claim 11, further comprising
generating a third EM signal from an other transmitter coupled to the tool; and
receiving a third response of the downhole element to the third EM signal using at least one of the plurality receivers of the first conformable sensor.

18. The method of claim 17, further comprising
receiving a measurement from the at least one of the plurality of receivers; and
outputting a control signal to the transmitter of the first conformable sensor in response to the received measurement.

19. The method of claim 11 wherein the first conformable sensor comprises one of a plurality of conformable sensors coupled to the tool.

20. The method of claim 11, wherein at least two of the plurality of receivers comprise different sizes.

* * * * *